United States Patent [19]
Marx et al.

[11] Patent Number: 6,103,835
[45] Date of Patent: Aug. 15, 2000

[54] EPOXY-FUNCTIONAL POLYESTER ADVANCED WITH CARBOXYL-FUNCTIONAL POLYESTER OR DICARBOXYLIC ACID (ANHYDRIDE)

[75] Inventors: Edward John Marx; Simon Ming-kung Li, both of Houston, Tex.; Petrus G. Kooijmans, AB's-Hertogenbusch, Netherlands

[73] Assignee: Shell Oil Company, Houston, Tex.

[21] Appl. No.: 09/189,883

[22] Filed: Nov. 11, 1998

[51] Int. Cl.[7] .......................... C08G 63/06; C08G 63/46; C08G 63/664; C08G 63/672; C08G 63/91
[52] U.S. Cl. .................... 525/444; 525/437; 525/448
[58] Field of Search ................................ 525/437, 444, 525/448

[56] References Cited

U.S. PATENT DOCUMENTS

| | | | |
|---|---|---|---|
| 4,097,466 | 6/1978 | Berger | 525/437 |
| 5,138,078 | 8/1992 | Brytus | 549/557 |
| 5,869,191 | 2/1999 | Van Gaalen | 525/437 |

FOREIGN PATENT DOCUMENTS

| | | |
|---|---|---|
| 9868246 | 9/1998 | Australia . |
| 0447360 A2 | 9/1991 | European Pat. Off. . |
| 0 518 408 A2 | 12/1992 | European Pat. Off. . |
| 0634434 A2 | 1/1995 | European Pat. Off. . |
| 0720997 A2 | 1/1996 | European Pat. Off. . |
| 19548491 A1 | 6/1997 | Germany . |
| 49-107398 | 10/1974 | Japan . |
| 51-98732 | 8/1976 | Japan . |
| WO 94/04589 | 3/1994 | WIPO . |
| 96/11238 | 4/1996 | WIPO . |
| WO 98/42768 | 1/1998 | WIPO . |
| WO 98/24828 | 11/1998 | WIPO . |

OTHER PUBLICATIONS

H. Blum, P. Höhlein, and J. Meixner, "Water Based Coatings With Excellent Saponification Stability," XlIIth Int. Conf. 1987, Athens, Greece, pp. 173–196.

T. Agawa and E.D. Dumain, "New Two–Component Powder Coating Binders: Polyester Acrylate Hybrid as TGIC Cure Alternative," Waterborne Higher Solids and Powder Coatings Symposium, Feb. 5–7, 1997, New Orleans, Louisiana.

*Primary Examiner*—Robert E. Sellers

[57] ABSTRACT

An epoxy-functional polyester storage-stable at temperatures of up to 40° C. and having a Tg of more than 40° C. is prepared by the reaction of an epoxy-functional polyester intermediate (III) produced by glycidating a carboxyl-functional polyester derived from (a) at least one secondary carboxyl groups-containing aromatic or cycloaliphatic dicarboxylic acid (anhydride), (b) at least one aliphatic hydroxyl groups-containing diol, (c) optionally, a compound containing one primary or secondary hydroxyl group, or a compound comprising one primary or secondary hydroxyl group and one tertiary aliphatic carboxyl group, (d) optionally, a compound comprising a tertiary aliphatic carboxyl group and two aliphatic hydroxyl groups and (e) optionally, a trihydroxyalkane or tetrahydroxyalkane; with (IV) a carboxyl-functional polyester obtained from (a) and (b) above, or (a) alone.

12 Claims, No Drawings

EPOXY-FUNCTIONAL POLYESTER ADVANCED WITH CARBOXYL-FUNCTIONAL POLYESTER OR DICARBOXYLIC ACID (ANHYDRIDE)

BACKGROUND OF THE INVENTION

The present invention relates to epoxy functional polyester resins, having an increased molecular weight, to a process for their preparation and to outdoor durable powder coating compositions comprising them.

Triglycidylesters which can be used in good quality outdoor durable coatings and in moulding compositions are disclosed in European Patent Application No. 447360A (EP-A-447,360). Due to the anhydride half ester nature of the terminal carboxyl functions present in the tricarboxylic acid adduct precursors, strong alkaline conditions should be avoided during glycidation of these tricarboxylic acid adducts to avoid hydrolysis of the glycidylester formed and/or hydrolysis of one or more ester groups in the resin backbone. As a result thereof the triglycidylester produced will contain a relatively high level of hydrolyzable chlorine and/or will contain low molecular weight hydrolysis products which might cause toxicity problems, as may be derived from "Water based coatings with excellent saponification stability," XIIIth Int. Conf. 1987, Athens, Greece, p. 175.

The high level of hydrolyzable chlorine is reflected in Example 2 of EP-A-447,360 which relates to the glycidation of the 2:1 adduct of hexahydrophthalic anhydride and dimethylolpropionic acid. The product obtained has a chlorine content of 1.5%. Such a high level of residual chlorine is generally undesirable in coating compositions. In addition, due to the fact that the triglycidylesters reported in EP-A-447,360 are liquid, they can not be applied in powder coating compositions.

In International Application WO 96/11238, it was taught to a person skilled in the art of this specific area of curable coatings, that epoxy resins containing cycloaliphatic nuclei had the disadvantage that they could only provide brittle coating films when cured. This brittleness made them unsuitable for coating applications, as brittleness often led to poor adhesion.

European patent application No. 634434A2 discloses a process for the preparation of linear tertiary aliphatic carboxyl functional polyester resins, by reacting:

(a) at least one compound A' comprising one monofunctional primary- or secondary hydroxyl group and/or at least one compound A" comprising one primary- or secondary hydroxyl group and one tertiary aliphatic carboxyl group;

(b) at least one aromatic or cycloaliphatic dicarboxylic acid compound B comprising two aromatic- or secondary aliphatic carboxyl groups or the anhydride thereof;

(c) at least one diol compound C comprising two aliphatic hydroxyl groups, which may independently be a primary or a secondary hydroxyl group; and (d) at least one dihydroxymonocarboxylic acid compound D comprising a tertiary aliphatic carboxyl group and two aliphatic hydroxyl groups, which may each independently be primary or secondary hydroxyl,
the molar ratio of compounds A':A":B:C:D being

M:N:X+Y+1:X:Y wherein M+N=2, X ranges from 2 to 8 and Y ranges from 2-N to 8, at a temperature of from 100 to 240° C., until essentially all the non-tertiary carboxyl groups as initially present in the reaction mixture have been reacted.

Moreover in this application were disclosed polyglycidylester resins obtainable by reacting said linear tertiary aliphatic carboxyl functional polyesters with an excess epihalohydrin in the presence of a suitable base and optional catalyst. Preferably, the polyesters were reacted with epichlorohydrin. Both the specified linear polyesters and the corresponding polyglycidylesters derived therefrom were used with a cross-linking agent for powder coating compositions.

In European patent application No. 720997A2, linear tertiary carboxyl functional polyesters and epoxy functional polyester resins are disclosed where these polyester resins were produced by reacting:

a) at least one aromatic and/or cycloaliphatic carboxylic acid compound A comprising two aromatic- and/or secondary aliphatic carboxyl groups or the anhydride thereof, b) at least one hydroxyl compound B comprising two aliphatic hydroxyl groups, which groups each independently may be primary or secondary hydroxyl groups, c) at least one hydroxyl substituted carboxylic acid compound C comprising at least one tertiary aliphatic carboxyl group and two aliphatic hydroxyl groups, which groups each independently may be primary or secondary hydroxyl groups, and d) optionally one carboxylic acid compound D comprising one carboxyl group,
the molar ratio of compounds A:B:C:D being (X+Y−1):X:Y:Z, wherein X ranges from 2 to 8, Y ranges from 2 to 8, and Z ranges from 0 to 2.

These polyester resins could be used together with a suitable curing agent for the production of powder coatings, or could be converted into the corresponding glycidylesters, which in combination with a suitable curing agent could be used for the production of powder coatings.

Although the linear tertiary aliphatic carboxyl functional polyester resins and the polyglycidylesters thereof enabled a certain progress as to the requirements of excellent outdoor durability (UV stability) and resistance against hydrolysis in the cured state with reference to their use in modern economically applied powder coatings, there is still a need for further improvement of this combination of properties.

On the other hand, novel powder coating binders for the exterior durable powder coating market derived from carboxylated polyester resins, cured with epoxy functional acrylate polymers, have been proposed during the Waterborne, Higher Solids and Powder Coatings Symposium, Feb. 5–7, 1997, New Orleans La., USA, T Agawa and E D Dumain, p. 342–353, "New Two-component Powder Coating Binders: Polyester acrylate hybrid as TGIC Cure Alternative.

However, as indicated on page 353, further improvements have to be made to provide smoother films, lower cure temperatures and UV durability to rival that of automotive topcoating or outdoor building panel topcoating.

The epoxy functional polyester resins obtainable according to the hereinbefore discussed documents, although showing attractive combinations coating properties, such as outdoor durability, flexibility, hardness, chemical resistance, could not meet the present storage stability requirement from the coating industry to powder coating compositions, comprising said epoxy functional polyester resins, to enable a conveniently handling, i.e. non-blocking or caking of the powder coatings when stored at temperatures up to 40° C.

In connection with said storage stability, the epoxy functional polyester resins aimed at have to show an increased Tg (i.e. >40° C.). One of the possibilities of increasing the Tg of epoxy functional polyester resins is to increase the molecular weight (MW) or the epoxy equivalent weight (WPE).

However, the intermediate carboxyl functional polyesters to be initially prepared as starting materials for the direct glycidation process for the preparation of the corresponding epoxy functional polyester resins having the increased MW will show a viscosity under the preparation process conditions which is unacceptable high (e.g. >80 poise at 200° C.).

Moreover, epoxy functional polyester resins which might have been obtained by a direct glycidation of carboxyfunctional polyester resins, which might show an even slightly increased MW, should inevitably have such a high viscosity that the further finishing, i.e. removal of used solvents and low molecular weight by-products (devolatilization), will be impossible.

Therefore it is an object of the present invention to provide a process for the preparation of linear, epoxy functional polyesters, which show an acceptable storage stability at temperatures up to 40° C. and which therefore show an increased Tg (over 40° C.).

It is another object of the present invention to provide powder coating compositions, which comprise said epoxy functional polyesters aimed at, and which combine the attractive coating properties with an acceptable storage stability.

SUMMARY OF THE INVENTION

Accordingly epoxy functional polyester resins (I) are provided which are storage stable at temperatures up to 40° C. and have a Tg of more than 40° C. and preferably more than 43° C. and more preferably more than 45° C., and which are obtainable by a process comprising the reaction of an epoxy functional polyester resin (II), produced by glycidating (reaction of epihalohydrin, preferably epichlorohydrin, in the presence of a base) a carboxyl functional polyester resins (III), obtainable by reacting:

(a) at least one aromatic or cycloaliphatic dicarboxylic acid compound A comprising two aromatic- or secondary aliphatic carboxyl groups or the anhydride thereof;

(b) at least one diol compound B comprising two aliphatic hydroxyl groups, which may independently be a primary or a secondary hydroxyl group; and optionally (c) compound C1 comprising one monofunctional primary- or secondary hydroxyl group and/or at least one compound C2 comprising one primary- or secondary hydroxyl group and one tertiary aliphatic carboxyl group; and optionally (d) a dihydroxymonocarboxylic acid compound D comprising
a tertiary aliphatic carboxyl group and two aliphatic hydroxyl groups, which may each independently be primary or secondary hydroxyl; and optionally (e) a trihydroxyalkane (E1) or tetrahydroxyalkane (E2), the molar ratio of compounds A:B:C1:C2:D:E1:E2 being

X+Y+1:X:M:N:Y:Z:Q wherein M+N is in the range of from 0 to 2, X ranges from 2 to 8 and Y ranges from 0 to 8, Z ranges from 0 to 2 and Q ranges from 0 to 2 at a temperature of from 100 to 220° C., until essentially all the non-tertiary carboxyl groups as initially present in the reaction mixture have been reacted, having a WPE in the range of from 250 to 800, with (IV) a carboxy functional polyester resin derived from the herein before mentioned component (a) and (b), or with a component (a) alone, in the presence of a catalyst.

Said epoxy functional polyester resins can be suitably used for the preparation of outdoor durable powder coating compositions, showing also a sufficient storage stability in combination with attractive coating properties.

DETAILED DESCRIPTION OF THE INVENTION

As indicated hereinbefore, the invention relates to a process for the advancement of relatively low molecular weight epoxy functional polyester resins into (WPE from 250 to 850) relatively high molecular weight epoxy functional polyester resins (WPE from 750 to 1200) by reacting the starting polyester with at least one of the diacid constituents (a) or a precondensed carboxyfunctional polyester oligomer, derived from diacid and diol constituents (a and b).

According to one preferred embodiment of the process of the present invention, an initially prepared starting epoxy functional polyester resin, having a WPE of from 250 to 500, will be converted into a similar epoxy functional polyester resin having a WPE from 800 to 1200.

For carrying this advancement reaction the epoxy functional polyester component and the diacid or polyester oligomer thereof, can be dry blended and heated to a temperature up to 180° C. kept for a short time on said temperature and rapidly cooled or the polyester oligomer or diacid coreactant can be mixed into the premolten epoxy functional polyester to be advanced, whereafter the actual (internal) reaction temperature is kept on from 140 to 150° C. during a reaction time of from 0.25 to 2 hours.

It will be appreciated that linear or branched final advanced resin can be produced, dependent on the type of the starting epoxy functional polyester resin.

According to a more preferred embodiment the starting epoxy functional polyester resins to be advanced according to the present invention, have been derived from carboxyl functional polyester resins produced by reacting:

a) at least one compound of the formula

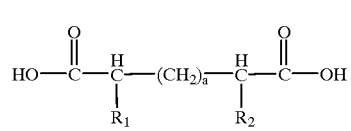

V wherein a≧1
wherein $R_1$ and $R_2$ each may represent an alkyl group having from 1 to 4 carbon atoms, or wherein $R_1$ and $R_2$ may form together with the group

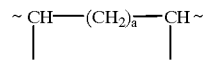

a cycloalkyl group, which preferably represents 1,4-cyclohexane dicarboxylic acid (A1), optionally mixed with minor amounts of a corresponding compound of formula V, wherein a=0 or anhydride thereof (A2), b) at least one diol compound B comprising two aliphatic hydroxyl groups which may each independently be a primary or a secondary hydroxyl group;

c) optionally a dihydroxymonocarboxylic acid compound C, comprising a tertiary aliphatic carboxyl group and two aliphatic hydroxyl groups, which may each independently be primary or secondary hydroxyl; and (d) optionally a trihydroxyalkane (E1) or tetrahydroxyalkane (E2), the molar ratio of compounds $(A_1+A_2):B:C:E1:E2$ being $X+Y+2Z+3Q+P:X:Y:Z:Q$, wherein X ranges from 1 to 8, Y ranges from 0 to 8, Z ranges from 0 to 1 and Q ranges from 0 to 1 and wherein P ranges from 1 to 5, and preferably 1–3 and is most preferably equal to 1, at a temperature of from 100 to 220° C., and preferably from 180 to 210° C. if any compound C is present, until essentially all the hydroxyl groups as initially present in the reaction mixture have been reacted.

With the term "minor amounts" as used the optional component A2 are meant amounts of from 0 to 10 mole %, relative to the total molar amount of A1 and A2.

Preferably carboxyl functional polyester resins are aimed at wherein Y>0 if Z+Q=0, or wherein Z+Q>0 if Y=0.

The process for preparation of the starting carboxyl functional polyesters, from which the initial epoxy functional polyesters to be advanced subsequently, can in general be carried out according to conventional esterification methods and preferably by azeotropic condensation, taking care that the terminal secondary carboxyl groups are only originating from 1,4-cyclohexane dicarboxylic acid. In particular, the condensation is carried out by charging the compounds A, B, optionally C and optionally D1 or D2, simultaneously to the reactor whereafter the temperature is increased from room temperature to a temperature in the range of from 180 to 220° C., preferably from 180 to 210° C. in the presence of any compound B, during a period of 3 to 8 hours, thus allowing the reaction to initiate and to proceed under continuous azeotropic removal of water. Generally the azeotropic removal of water is being continued until at least 90% of the original hydroxyl groups have reached and more preferably at least 95% of the original hydroxyl groups have reacted. An esterification catalyst known in the art, such as for example dibutyltinoxide, paratoluenesulphonic acid, tinoctoate, zincoctoate and lithium ricinoleate may be used in the esterification process, but is in general not required.

In order to be sure that the terminal secondary carboxyl groups have originated from the structure of formula V dicarboxylic acid wherein $a \geq 1$, and in particular 1,4-cyclohexane dicarboxylic acid, and not from the corresponding 1,2-structure (a=0) and in particular 1,2-dicyclohexane dicarboxylic acid, a part of the total batch of e.g. 1,4-cyclohexane dicarboxylic acid to be included, may be added during the reaction and more preferably in its last stage.

Suitable compounds B for use in the preparation of the starting carboxy functional polyesters include branched aliphatic-, cycloaliphatic-, or araliphatic compounds, containing two aliphatic hydroxyl groups, each individually being either a primary or a secondary hydroxyl group, such as for example propylene glycol, neopentyl glycol, hydrogenated diphenylolpropane (HDPP), hydrogenated 4,4'-dihydroxydiphenyl, 1,4-cyclohexanedimethylol, 1,4-dihydroxycyclohexane, hydroxypivalylhydroxypivalate and 2-butyl-2-ethyl-1,3-propanediol or mixtures thereof; of which HDPP is particularly preferred.

Typical examples of a suitable compound C1 for the preparation of starting carboxy functional polyesters are aliphatic alcohols and cycloaliphatic alcohols, having primary or one secondary hydroxyl group and having from 1 to 6 carbon atoms such as neopentanol, 2-butanol, cyclohexanol, or a 1:1 adduct of a VERSATIC acid and a glycidylester of a VERSATIC acid, having from 5 to 13 carbon atoms.

Suitable compounds C2 are aliphatic and cycloaliphatic alcohols having one primary or one secondary hydroxyl group and having of from 1 to 6 carbon atoms and in addition one tertiary aliphatic carboxyl group, such as 1-methyl-4-hydroxycarboxylic acid, hydroxypivalic acid.

A typical example of a suitable compound D for use in the preparation of starting carboxy functional polyester is dimethylol propionic acid (DMPA).

A typical and preferred example of compound E, if any, is used for the preparation of the starting branched glycidyl functional polyesters, to be used for the process of the present invention, is trimethylol propane and a preferred example of compound E2 if any is used, is pentaerythritol.

It will be appreciated that the starting glycidyl functional polyester resins can be obtained by easy conversion of a precursor carboxy functional polyester resin with an excess epihalohydrin, in the presence of a suitable base and optionally a catalyst. Most conveniently epichlorohydrin is used.

It was found that those polyglycidyl ester resins to be used as starting material (II) for the process of the present invention, are preferred, which have been derived from carboxyl functional polyester resins (III), wherein Y ranges from 1 to 4, X simultaneously ranges from 1 to 6, Z ranges from 0 to 1 and Q ranges from 0 to 1, can provide the more preferred outdoor durable powder coating compositions. Most preferably polyglycidyl ester resins are used, wherein X ranges from 1 to 4, Y ranges from 1 to 2, Z=0, Q=0.

As indicated hereinbefore, the starting polyglycidyl ester resin can be reacted either with a carboxy functional polyester resins derived from the hereinbefore specified components (a) and (b) or with a component (a) alone.

A preferred coreactant for the polyglycidyl ester resin is formed by adducts of hexahydrophthalic anhydride (HHPA) and hydrogenated diphenylol propane (HDPP), adducts of 1,4-cyclohexanedicarboxylic acid(1,4-CHDA) and hydrogenated bisphenol A, in a molar ratio of from 4:1 to 1:1 and more preferably about 2:1, or HHPA or 1,4-CHDA alone or mixtures thereof.

More preferably adducts of 1,4-cyclohexanedicarboxylic acid and hydrogenated diphenylol propane (HDPP) in a molar ratio of 2:1, are used.

Examples of suitable catalysts which can be used for the process of the present invention may be selected from tetra(hydrocarbyl)-ammonium or -phosphonium compounds or metal salts/compounds such as stannous II octoate, basic compounds such as imidazoles and tertiary amines such as diazabicyclo undecene.

More preferred catalysts are ethyltriphenylphosphonium halide and more preferably ethyltriphenyl phosphonium iodide, tetra(alkyl)ammonium chloride, tetra(alkyl) ammonium iodide, and more preferably tetramethylammonium iodide, dimethyl dibenzyl ammonium iodide, diethyl dibenzyl ammonium iodide.

It will be appreciated that another aspect of the present invention is formed by the specific, advanced polyglycidyl esters obtainable by the hereinbefore specified process.

Due to the specific polymeric nature of these advanced polyglycidyl ester resin of the present invention, a relatively low level of toxicity can now be combined with excellent coating properties and attractive storage stability due to the increased Tg, whereas the melt viscosity is sufficiently low to enable a good processing of the resin into the final powder coating composition.

The curable outdoor durable powder coating compositions, forming another aspect of the present invention, may be prepared by addition of a cross-linking resin to the hereinbefore specified advanced polyglycidyl ester resin (I).

As cross-linking resin a precursor carboxy functional polyester resin (III) from which the intermediate initially prepared polyglycidyl ester (II) can be derived by glycidation, can be used. Preferably said precursor has a polyester chain microstructure which is rather similar to that of the final polyglycidylester.

The amount of cross-linking compound used in the powder coating compositions of the invention will normally be such so as to provide about equal amounts of reactive groups of the cross-linking compound and the epoxy groups present in the advanced polyglycidyl ester resin.

However, other suitable cross-linking resins can also be used in combination with the advanced polyglycidyl ester resins of the present invention, such as solid polyacids such as sebacic acid, 1,12-dodecanedioic acid; anhydrides such as polyazeleic polyanhydride; acid functional polyesters such as the reaction product of one mole of trimethylolpropane and 3 moles of hexahydrophthalic anhydride, the reaction product of 1,6-hexanediol with a molar excess of 1,12-dodecanedioic acid, the reaction product of 4 moles 1,10-decanedicarboxylic acid, 1.49 mols hexanediol, 0.47 mols 1,1,1-tris-(hydroxymethyl)-propane and 0.27 mols pentaerythritol, the reaction product of 4 mols 1,10-decanedicarboxylic acid, 1.2 mols hexanediol, 0.45 mols trimethylolpropane, 0.29 mols pentaerythritol and 0.21 mols dimethylolpropionic acid and the reaction product of one mole of hexamethoxymethylmelamine and 3 moles of hydroxypivalic acid and amine-type curing agents.

The powder coating compositions of the present invention may further comprise a catalyst and optionally other additives, as known in the art to be suitable for use in powder coating compositions.

Suitable catalysts are for example quaternary ammonium and phosphonium salts; metal salts/compounds such as for example stannous(II)octoate; basic compounds such as for example the imidazoles; and tertiary amines such as for example diazabicycloundecene.

The amount of catalyst used will usually be somewhere in the range of from 0.01 to 2% by weight based on the weight of the total powder coating composition.

Suitable cure times and cure temperatures of the powder coating compositions of the invention are those conventionally applied in connection with powder coating systems.

EXAMPLES

The invention is illustrated by the following examples, however without restricting its scope to these specific embodiments.

Example 1

Preparation of Carboxyl Functional Polyester P1 to P4

1,4-cyclohexanedicarboxylic acid (1,4-CHCA), dimethylolpropionic acid (DMPA) and hydrogenated diphenylol propane (HDPP) were charged in molar amounts as indicated in Table 1 hereinafter, in a round bottom glass reactor, equipped with a condenser, temperature control, nitrogen inlet, stirrer and vacuum inlet.

The mixture was then heated to 150° C. in 30 minutes. The temperature of the reaction mixture was increased in two hours to 210° C. and kept at 210° C. until at least 94% of the original hydroxyl groups have reacted. The acid functional polyester thus formed was discharged and allowed to cool down to room temperature.

Example 2

Preparation of Corresponding Polyglycidyl Ester Resins E1, E2, E3 and E4

An amount equalling 1 carboxyl group equivalent of linear tertiary and partly secondary aliphatic carboxyl functional polyester resins obtained as samples P3, P4, P5, P6 and P7 respectively in Table 1, was dissolved in 16 moles epichlorohydrin (ECH), 15.5 moles isopropylalcohol (IPA) and 15.5 moles of demi-water. The solution was charged to a glass-reactor equipped with a temperature control, stirrer and reflux condenser. Next, the temperature was raised to 70° C., followed by gradual addition of a 50% wt aqueous solution of 0.16 moles of NaOH over a period of 20 min. The temperature is increased during this caustic addition from 70 to 80° C. At this temperature the mixture is stirred until virtually all acid groups are converted (approx. 50 min.). Subsequently, the mixture is cooled to 55° C. At this temperature, gradual addition of a 50% wt aqueous solution of 0.92 moles of NaOH over a period of 60 min. followed. After a post-reaction of 5 min., 15 moles of water was added and the mixture was stirred for 5 min. The reactor content was allowed to settle and subsequently the brine was separated from the organic phase. The excess of ECH, the IPA and some remaining water was flashed off with vacuum.

The resulting crude resin E1, E2, E3 and E4 was dissolved in methyl isobutyl ketone (MIBK) (MIBK/resin=5/1 v/v) and washed 4 times with water (water/resin=1/1 v/v) at 70–75° C. The MIBK is removed by vacuum flash and the polyglycidylester was discharged from the reactor and allowed to cool down.

It will be appreciated that the epoxy functional polyester resins are also obtainable by other glycidation process embodiments, known in the art.

The epoxy resins obtained showed the properties as listed in Table II.

Example 3

Preparation of Advanced Polyglycidyl Ester Resins from the Polyglycidylesters E1, E2, E3 and E4 with Diacid Compounds P5 (1,4-CHDA), P6 and P7

250 g of a selected polyglycidyl ester was weighed into a reactor of 1 litre, which has been provided with nitrogen inlet and outlet, drain cock, distillation equipment, mechanical stirrer heating jacket and thermocouples for internal and jacket temperature measurements. The resin was melted at a temperature in the range of from 150 to 180° C.

The molten resin was kept at a temperature of around 140° C. under stirring and the diacid compound was added under vigorously stirring. The reaction time start (t=0) was calculated from the time point on which the diacid had completely dissolved. The reaction was followed via EGC and viscosity measurements, whereby a maximum viscosity was regarded of 30 poise at 200° C.

The reaction mixture was drained off when the viscosity had reached this value, irrespective of the decrease of EGC.

The reaction was stopped if the EGC and viscosity got a constant value by draining off the reaction mixture (dumping). Products obtained have characteristics as listed in Table III.

TABLE I

| | Epoxy polyesters | | | |
|---|---|---|---|---|
| Epoxy Resin code | E1 | E2 | E3 | E4 |
| Epoxy resin precursor Composition | P1 | P2 | P3 | P4 |
| 1,4-CHDA (mol) | 6.5 | 4.5 | 4.5 | 4.5 |
| DMPA (mol) | 1.5 | 1.0 | 1.5 | 2.0 |
| HDPP (mol) | 4.0 | 2.5 | 2.0 | 1.5 |
| Viscosity* | >100 | 55 | 34.5 | 25 |

TABLE I-continued

Epoxy polyesters

| Characteristics Epoxy Resin | | | | |
|---|---|---|---|---|
| Mn (calc.) | 2318 | 1576 | 1546 | 1516 |
| WPE (g/eq) | 800 | 604 | 514 | 434 |
| CARC (%)° | 51.4 | 49.5 | 45.2 | 40.6 |
| Viscosity* | 16.5 | 3.8 | 2.1 | 0.8 |

*ICI Cone & Plate 200° C.
°CARC means cycloaliphatic ring content in the epoxy resin expressed in percent by weight, as the molecular weight of the cycloaliphatic ring 82 is used for calculations.

TABLE II

Diacids used for advancement

| | Diacid code | | |
|---|---|---|---|
| | P5 | P6 | P7 |
| Composition | | | |
| HDPP (mol) | — | 1.5 | 3.0 |
| 1,4-CHDA (mol) | 1.0 | 2.5 | 4.0 |
| Characteristics | | | |
| Mn (calc.) | 172 | 751 | 1331 |
| CARC. (%) | 47.7 | 60.1 | 61.7 |
| Viscosity* | n.d | 13.3 | 85 |
| WPA (g/eq) | 86 | 375 | 665 |

*see footnote Table I

TABLE III

Advanced epoxy resin

| Advanced epoxy resin code | AER-1 | AER-2 | AER-3 | AER-4 | AER-5 | AER-6 | REF |
|---|---|---|---|---|---|---|---|
| Composition | | | | | | | |
| Epoxy polyester | E2 | E2 | E2 | E3 | E3 | E3 | E1 |
| Weight (g) | 97 | 92 | 89 | 95 | 86 | 81 | 100 |
| Carboxyl polyester or di-acid | P5 | P6 | P7 | P5 | P6 | P7 | — |
| Weight (g) | 3 | 8 | 11 | 5 | 14 | 19 | — |
| Characteristics | | | | | | | |
| Mn (Calc) | 2167 | 2115 | 2064 | 2948 | 2699 | 2534 | 2318 |
| WPE (g/eq) | 801 | 799 | 767 | 803 | 811 | 768 | 800 |
| Carc (%) | 49.5 | 50.4 | 50.4 | 45.3 | 47.3 | 48.2 | 51.4 |
| Tg | 44 | 48 | 42 | 41 | 44 | 41 | 32 |
| Stability* | | | | | | | |
| 25° C. | 1 | 1 | 1 | 1 | 1 | 1 | 2 |
| 35° C. | 1 | 1 | 2 | 2 | 1 | 2 | 3 |

*Physical storage stability. Samples of powdered resin (+/− 25 g) were stored in close containers at 25° C. and 35° C. After 7 days it was checked if the powdered resin was still able to flow freely. The following rating was used:
1. Not blocked (the powdered resin was totally free flowing)
2. Tendency to blocking (the powdered resin was neither totally free flowing nor fully blocked)
3. Blocked (the powdered resin was fully caked).

We claim:

1. An epoxy functional polyester resin, which is storage stable at temperatures up to 40° C., has a Tg of more than 40° C., and is produced by a process, comprising:

reacting an intermediate epoxy functional polyester resin produced by glycidating a first carboxyl functional polyester resin (III) produced by reacting:

(a) at least one aromatic or cycloaliphatic dicarboxylic acid compound A comprising two aromatic or secondary aliphatic carboxyl groups or the anhydride thereof;

(b) at least one diol compound B comprising two aliphatic hydroxyl groups, which independently are a primary or a secondary hydroxyl group;

(c) optionally compound C1 comprising one monofunctional primary- or secondary hydroxyl group and optionally compound C2 comprising one primary or secondary hydroxyl group and one tertiary aliphatic carboxyl group;

(d) optionally a dihydroxymonocarboxylic acid compound D comprising a tertiary aliphatic carboxyl group and two aliphatic hydroxyl groups, which independently are primary or secondary hydroxyl; and (e) optionally a trihydroxyalkane (E1) or tetrahydroxyalkane (E2), the molar ratio of compounds A:B:C1:C2:D:E1:E2 being X+Y+1:X:M:N:Y:Z:Q;

wherein M+N is in the range of from 0 to 2, X ranges from 2 to 8 and Y ranges from 0 to 8, Z ranges from 0 to 2, and Q ranges from 0 to 2 at a temperature of from 100 to 220° C., until essentially all the non-tertiary carboxyl groups as initially present in the reaction mixture have been reacted, the intermediate epoxy functional polyester resin having a WPE in the range of from 250 to 800;

with (IV) one member selected from the group consisting of a second carboxyl functional polyester derived from dicarboxylic acid or anhydride (a) and diol (b), and dicarboxylic acid or anhydride (a) alone.

2. The epoxy functional polyester of claim 1 having a Tg of more than 43° C.

3. The epoxy functional polyester resin of claim 1 wherein the intermediate epoxy functional polyester resin has a WPE of from 250 to 500 and is converted into an epoxy functional polyester resin having a WPE from 800 to 1200.

4. An epoxy functional polyester resin produced by reacting an intermediate epoxy functional polyester resin, that is produced by glycidating a first carboxyl functional polyester resin, with a second carboxyl functional polyester resin, wherein the first carboxyl functional polyester resin is produced by reacting:

(a) at least one compound (A1) of the formula:

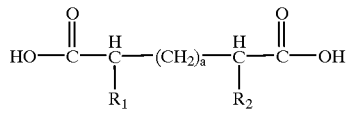

V wherein $a \geq 1$, and wherein $R_1$ and $R_2$ each represent an alkyl group having from 1 to 4 carbon atoms, or $R_1$ and $R_2$ form, together with the group ~CH—(CH$_2$)$_a$—CH~, a cycloalkyl group, optionally mixed with minor amounts of a corresponding compound (A2) of formula V, wherein a=0 or anhydride thereof;

b) at least one diol compound B comprising two aliphatic hydroxyl groups which independently are a primary or a secondary hydroxyl group;

c) optionally a dihydroxymonocarboxylic acid compound C, comprising a tertiary aliphatic carboxyl group and two aliphatic hydroxyl groups, which independently are primary or secondary hydroxyl; and d) optionally a trihydroxyalkane (E1) or tetrahydroxyalkane (E2), the molar ratio of compounds $(A_1+A_2)$:B:C:E1:E2 being X+Y+2Z+3Q+P:X:Y:Z:Q, wherein X ranges from 1 to 8, Y ranges from 0 to 8, Z ranges from 0 to 1, Q ranges from 0 to 1, and P ranges from 1 to 5, at a temperature of from 100 to 220° C., or from 180 to 210° C. if any compound C is present, until essentially all the hydroxyl groups as initially present in the reaction mixture have been reacted.

5. The epoxy functional polyester resin of claim 4 wherein compound (A1) of formula V is 1,4-cyclohexane dicarboxylic acid, which is optionally mixed with minor amounts of 1,2-cyclohexane dicarboxylic acid or anhydride thereof (A2).

6. The epoxy functional polyester resin of claim 4 wherein P ranges from 1–3.

7. The epoxy functional polyester resin of claim 6 wherein P is equal to 1.

8. The epoxy functional polyester resin of claim 4 wherein Y ranges from 1 to 4, X ranges from 1 to 6, Z ranges from 0 to 1, and Q ranges from 0 to 1.

9. The epoxy functional polyester resin of claim 8 wherein Y ranges from 1 to 2, X ranges from 1 to 4, Z=0 and Q=0.

10. The epoxy functional polyester resin of claim 1 wherein compound A is 1,4-cyclohexane dicarboxylic acid, which is optionally mixed with minor amounts of 1,2-cyclohexane dicarboxylic acid or anhydride thereof.

11. The epoxy functional polyester resin of claim 1 wherein the intermediate epoxy functional polyester is reacted with adducts of hexahydrophthalic anhydride (HHPA) and hydrogenated bisphenol-A (HBPA), in a molar ratio of from 4:1 to 1:1; adducts of 1,4-cyclohexanedicarboxylic acid (1,4-CHDA) and hydrogenated bisphenol-A, in a molar ratio of from 4:1 to 1:1; HHPA; 1,4-CHDA; or mixtures thereof.

12. The epoxy functional polyester resin of claim 11 wherein the adducts of 1,4-cyclohexane dicarboxylic acid and hydrogenated bisphenol-A, in a molar ratio of 2:1 are reacted with the intermediate epoxy functional polyester resin.

* * * * *